United States Patent Office 3,122,554
Patented Feb. 25, 1964

3,122,554
1,5-DIHYDRO - 5 - PHENYL - 4,1 - BENZOXAZEPIN-2[3H] - ONES AND PROCESSES FOR THEIR PREPARATION
George Ireland Poos, Ambler, Pa., assignor to McNeil Laboratories, Incorporated, a corporation of Pennsylvania
No Drawing. Filed Dec. 13, 1962, Ser. No. 244,253
9 Claims. (Cl. 260—239.3)

This invention relates to a new series of organic compounds. More particularly, the invention relates to certain 1,5 - dihydro-5-phenyl-4,1-benzoxazepin-2[3H]-ones and to methods for their preparation.

The compounds of this invention may be represented by the following structural formula:

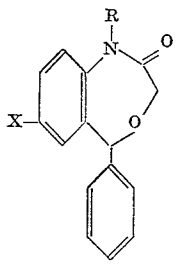

wherein R is a member selected from the group consisting of hydrogen and lower alkyl and X is a halogeno radical such as bromo, fluoro or, preferably, chloro. Lower alkyl groups represented by R in the above formula are those containing from 1 to 7 carbon atoms such as methyl, ethyl, propyl, butyl, pentyl, isopentyl, and hexyl and their isomeric forms.

The compounds of this invention in tests on animals show marked decrease in motor activity, muscle tone and spontaneous activity and are therefore useful as central nervous system depressants, tranquilizers, and muscle relaxants.

To prepare the novel 1,5-dihydro-5-phenyl-4,1-benzoxazepin-2[3H]-ones of this invention, the appropriate 2-aminobenzhydrol is treated with a basic condensing agent in the presence of an organic solvent. When the reaction is complete, the resulting anion is treated with a halo acetic ester which may be introduced into the reaction mixture as such or in organic solvent solution. After completion of the reaction, which occurs at room temperature, the cyclized product is separated from the reaction mixture. As halo acetic esters there may be used methyl bromoacetate, methyl chloroacetate or preferably ethyl chloroacetate.

Alternatively, preparation of the novel 1,5-dihydro-5-phenyl-4,1-benzoxazepin-2[3H]-ones is accomplished by reacting the appropriate 2-aminobenzhydrol with an alpha-halo acid chloride, i.e. chloroacetyl chloride in the presence of a water immiscible organic solvent and an aqueous base to give the corresponding chloroacetamido derivative. The latter is cyclized under basic conditions. The required 2-aminobenzhydrols are obtained by reducing the known 2-aminobenzophenones in the presence of an organic solvent.

The secondary amide group on the 1,5-dihydro-5-phenyl-4,1-benzoxazepin-2[3H]-ones is alkylated by reaction with the appropriate lower alkyl halide or lower alkyl ester of sulfuric or a sulfonic acid, following treatment with a strong base in the presence of an organic solvent.

As basic condensing agents there may be used alkaline compounds such as hydroxides, alcoholates, hydrides, amides or hydrocarbon compounds of alkali metals or alkaline earth metals; for example, those of sodium, lithium or potassium. A suitable organic solvent for this reaction is a hydrocarbon solvent such as toluene, xylene, hexane, heptane or preferably benzene; an alkanol such as methanol, 2-propanol, t-butanol or ethanol; or an ether such as diethylether, dioxane or tetrahydrofuran.

The reduction step may be carried out with any one of a variety of well-known reducing agents such as, for example, a complex metal hydride, i.e. sodium borohydride, potassium borohydride or, preferably lithium aluminum hydride, advantageously, in the case of the borohydrides, in the presence of a polar solvent such as methanol, ethanol, 2-propanol or water and, in the case of lithium aluminum hydride, an aprotic solvent such as anhydrous ether, ethyleneglycol dimethylether or tetrahydrofuran.

Basic conditions for condensation of the aminobenzhydrol with the α-halo acid halide are obtained by the use of aqueous solution of an alkali metal or alkaline earth metal hydroxide in the presence of a water immiscible organic solvent such as halogenated hydrocarbons, i.e. chloroform, ethylene chloride or preferably methylene chloride or an ether or hydrocarbon.

Cyclization of the haloacetamidobenzhydrols is conveniently carried out with alkali metal alcoholates in alkanols, i.e. sodium ethoxide in ethanol, sodium methoxide in methanol or potassium t-butoxide in t-butanol; with alkali metal hydroxides in alkanols such as potassium hydroxide in methanol or with a strongly basic ion exchange resin, i.e. of the quaternary ammonium hydroxide type in a suitable solvent such as a lower alkanol or ether such as tetrahydrofuran or dioxane.

Introduction of an alkyl group at the secondary nitrogen atom is carried out with an appropriate alkylating agent, i.e. a hydrocarbon halide such as methyliodide, ethyl bromide, allyl chloride or butyl bromide or an alkyl ester of an inorganic acid such as diethylsulfate, di-n-butyl sulfate, n-butyl-p-toluenesulfonate, dimethylsulfate and the like. The alkylation is carried out in a variety of polar or nonpolar solvents such as the lower alkanols, e.g. methyl alcohol, ethyl alcohol, isopropyl alcohol; ethers; esters or hydrocarbons.

The following examples are intended to illustrate, but not to limit, the scope of the present invention.

*Example I*

A solution of 13.1 parts by weight of 2-aminobenzhydrol [P. Ruggli, B. Hegedus, Helv. Chim. Acta, 24, 703 (1941)], in 150 parts by volume of benzene is treated with 4.8 parts by weight of 50% sodium hydride dispersion in oil. The mixture is stirred for one hour and then treated with a solution of 8.0 parts by weight of freshly distilled ethyl chloroacetate in 100 parts by volume of benzene over a 20-minute period. The reaction mixture is stirred for 3 hours and then extracted with dilute hydrochloric acid solution. The benzene layer is separated, dried over anhydrous magnesium sulfate and is filtered and concentrated to dryness under reduced pressure. The residual gummy solid is triturated with ether and collected by filtration. Recrystallization of this crude product from dimethylformamide-water and from methylene chloride-ether gives pure 5-phenyl-1,5-dihydro-4,1-benzoxazepin-2[3H]-one, melting at 195–195.5° C.

*Example II*

To a mixture of 4.2 parts by weight of lithium aluminum hydride in 100 parts by volume anhydrous ether is added a solution of 23.2 parts by weight of 2-amino-5-chlorobenzophenone (L. H. Sternbach et al., J. Org. Chem., 1961, 26, 4488) in 300 parts by volume of anhydrous ether. The resulting mixture is stirred at room temperature for 15 hours and then decomposed by the careful drop-wise addition of 21 parts by volume of water. The reaction mixture is filtered and the filter cake is washed thoroughly with ether. The filtrate and washes are combined and concentrated to dryness under reduced pressure giving an orange crystalline residue. Purification by recrystallization from ethyl acetate-hexane gives pure 2-amino-5-chlorobenzhydrol, melting at 107–108.5° C.

*Example III*

A mixture of 19.4 parts by weight of 2-amino-5-chlorobenzhydrol, 250 parts by volume of methylene chloride, 100 parts by volume of water, and 75 parts by volume of 30% aqueous sodium hydroxide is cooled in an ice bath and, with rapid stirring, treated with 10.2 parts by weight of freshly distilled chloroacetyl chloride. The mixture is stirred for 2 hours at room temperature. The organic layer is separated and the aqueous phase is extracted with methylene chloride. The combined organic parts are extracted with dilute hydrochloric acid, washed with water, dried over anhydrous magnesium sulfate, filtered and concentrated to dryness under reduced pressure. The resulting crude solid product is purified by recrystallization from ethyl acetate-hexane to give pure 5-chloro-2-(alpha-chloroacetamido)benzhydrol, melting at 143.5–145° C.

*Example IV*

To a solution of 5.6 parts by weight of 85% potassium hydroxide in 200 parts by volume of absolute ethanol is added 13.1 parts by weight of 5-chloro-2-(alpha-chloroacetamido)benzhydrol. The reaction mixture is stirred for 18 hours at room temperature and diluted with water. The resulting solid product is collected by filtration, washed with water and then with ethanol and ether. The crude product is purified by recrystallization from dimethylformamide. The pure 7-chloro-1,5-dihydro-5-phenyl-4,1-benzoxazepin-2[3H]-one melts at 233–233.5° C.

*Example V*

A solution of 5.5 parts by weight of 7-chloro-1,5-dihydro-5-phenyl-4,1-benzoxazepin-2[3H]-one in 300 parts by volume of benzene is treated with 1.1 parts by weight of anhydrous sodium methoxide and then a portion of the benzene is removed by distillation to insure dryness. While still warm, the resulting solution is treated with 1.9 parts by volume of dimethylsulfate. The cloudy reaction mixture is stirred for 15 hours at room temperature and then is washed with water. The benzene layer is separated, dried over anhydrous magnesium sulfate, filtered and concentrated to dryness under reduced pressure. Distillation of the oily residue provides pure 7-chloro-1,5-dihydro-1-methyl-5-phenyl-4,1-benzoxazepin-2[3H]-one as a thick oil, boiling point 140–148° C. (0.03 mm.).

What is claimed is:

1. A member selected from the group consisting of:

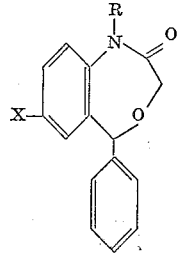

wherein R is a member selected from hydrogen and lower alkyl and X is a member of the group consisting of hydrogen and halo.

2. 5-phenyl-1,5-dihydro-4,1-benzoxazepin-2-[3H]-one.

3. 7-halo-1,5-dihydro-5-phenyl-4,1-benzoxazepin-2[3H]-one.

4. 7-chloro-1,5-dihydro-5-phenyl-4,1-benzoxazepin-2[3H]-one.

5. 7-halo-1,5-dihydro-1-lower alkyl-5-phenyl-4,1-benzoxazepin-2[3H]-one.

6. 7-chloro-1,5-dihydro-1-lower alkyl-5-phenyl-4,1-benzoxazepin-2[3H]-one.

7. 7-chloro-1,5-dihydro-1-methyl-5-phenyl-4,1-benzoxazepin-2[3H]-one.

8. The process for producing a 5-phenyl-1,5-dihydro-4,1-benzoxazepin-2[3H]-one which comprises reacting an appropriate 2-aminobenzhydrol with a suitable base and halo acetic ester.

9. The process for producing a 5-phenyl-1,5-dihydro-4,1-benzoxazepin-2[3H]-one which comprises reacting an appopirate 2-aminobenzhydrol with a halo acetyl halide in the presence of a base followed by cyclization of the resulting 2-haloacetamidobenzhydrol with a basic catalyst.

No references cited.